(12) United States Patent
Peterman et al.

(10) Patent No.: US 7,008,185 B2
(45) Date of Patent: **\*Mar. 7, 2006**

(54) GAS TURBINE ENGINE TURBINE NOZZLE BIFURCATED IMPINGEMENT BAFFLE

(75) Inventors: Jonathan Jordan Peterman, West Chester, OH (US); Andrew Charles Powis, Maderia, OH (US); Ronald Eugene McRae, Jr., Cincinnati, OH (US); Jonathan Philip Clarke, West Chester, OH (US); Robert Alan Frederick, West Chester, OH (US); Edward Eugene Gibler, West Chester, OH (US); Brian David Keith, Cincinnati, OH (US)

(73) Assignee: General Electric Company, Schenectady, NY (US)

( \* ) Notice: Subject to any disclaimer, the term of this patent is extended or adjusted under 35 U.S.C. 154(b) by 196 days.

This patent is subject to a terminal disclaimer.

(21) Appl. No.: 10/375,415

(22) Filed: Feb. 27, 2003

(65) Prior Publication Data

US 2004/0170498 A1  Sep. 2, 2004

(51) Int. Cl.
*F01D 9/02* (2006.01)
*F01D 5/18* (2006.01)
(52) U.S. Cl. ..................... 416/96 A; 415/115
(58) Field of Classification Search ............. 29/889.22; 415/115, 189, 191, 209.2, 209.3; 416/96 A, 416/96 R, 97 A, 233
See application file for complete search history.

(56) References Cited

U.S. PATENT DOCUMENTS

| 3,540,810 | A | | 11/1970 | Kercher |
| 3,628,880 | A | \* | 12/1971 | Smuland et al. ............ 415/175 |
| 3,715,170 | A | \* | 2/1973 | Savage et al. ............ 416/97 R |
| 4,153,386 | A | | 5/1979 | Leogrande et al. |
| 4,257,734 | A | | 3/1981 | Guy et al. |
| 4,297,077 | A | \* | 10/1981 | Durgin et al. ............ 416/97 R |
| 5,090,866 | A | | 2/1992 | Blair |
| 5,516,260 | A | | 5/1996 | Damlis et al. |

(Continued)

*Primary Examiner*—Edward K. Look
*Assistant Examiner*—Richard A. Edgar
(74) *Attorney, Agent, or Firm*—William Scott Andes; Steven J. Rosen

(57) ABSTRACT

A turbine nozzle bifurcated impingement baffle includes axially forward and aft chambers with a gap therebetween, impingement holes through forward and aft baffle walls of the forward and aft chambers respectively, and a plenum chamber in fluid flow communication with the forward and aft chambers. An exemplary embodiment of the bifurcated impingement baffle further includes a single cooling air inlet to the plenum chamber enclosed within a plenum chamber enclosure the plenum chamber. A sealing plate is mounted between and sealed to the plenum chamber enclosure and the forward and aft chambers. The sealing plate has forward and aft inlet apertures disposed between the plenum chamber and the forward and aft chambers respectively. Forward and aft end plates cap radially inner ends of the forward and aft chambers. An outlet aperture in the forward end plate has an interstage seal cavity feed tube disposed therethrough.

21 Claims, 10 Drawing Sheets

U.S. PATENT DOCUMENTS

| | | |
|---|---|---|
| 5,630,700 A | 5/1997 | Olsen et al. |
| 5,645,397 A * | 7/1997 | Soechting et al. .......... 415/115 |
| 5,813,832 A * | 9/1998 | Rasch et al. ................ 415/200 |
| 6,089,822 A * | 7/2000 | Fukuno ...................... 415/115 |
| 6,158,955 A | 12/2000 | Caddell, Jr. et al. |
| 6,227,798 B1 | 5/2001 | Demers et al. |
| 6,375,415 B1 | 4/2002 | Burdgick |
| 6,382,906 B1 | 5/2002 | Brassfield et al. |
| 6,435,814 B1 | 8/2002 | Yu et al. |
| 6,468,031 B1 | 10/2002 | Yu et al. |
| 6,494,677 B1 | 12/2002 | Grady |
| 6,761,529 B1 * | 7/2004 | Soechting et al. .......... 415/115 |

* cited by examiner

GAS TURBINE ENGINE TURBINE NOZZLE BIFURCATED IMPINGEMENT BAFFLE

BACKGROUND OF THE INVENTION

1. Field of the Invention

The invention relates to gas turbine engines turbine nozzles segments and, particularly, for such segments having hollow vanes or airfoils with a cavity for receiving a cooling air distributing baffle.

2. Description of Related Art

In a typical gas turbine engine, air is compressed in a compressor and mixed with fuel and ignited in a combustor for generating hot combustion gases. The gases flow downstream through a high pressure turbine (HPT) having one or more stages including one or more HPT turbine nozzles and rows of HPT rotor blades. The gases then flow to a low pressure turbine (LPT) which typically includes multi-stages with respective LPT turbine nozzles and LPI rotor blades.

The HPT turbine nozzle includes a plurality of circumferentially spaced apart stationary hollow nozzle vanes supported between radially outer and inner bands. Typically, a single chamber impingement baffle is inserted in each hollow airfoil to supply cooling air to the airfoil. Each baffle can be fed through a single spoolie located radially outwardly of the outer band of the nozzle.

The turbine rotor stage includes a plurality of circumferentially spaced apart rotor blades extending radially outwardly from a rotor disk which carries torque developed during operation. The HPT nozzles are typically formed in arcuate segments having two or more hollow vanes joined between corresponding segments of the outer and inner bands. Each nozzle segment is typically supported at its radially outer end by a flange bolted to an annular outer casing. Each vane has a cooled hollow airfoil disposed between radially inner and outer band panels which form the inner and outer bands. The airfoil, inner and outer band portions, flange portion, and intake duct are typically cast together such that each vane is a single casting. The vanes are brazed together along interfaces of the flange segments, inner band panels, and outer band panels to form the nozzle segment. Two or more airfoils may also be cast together in a single vane or nozzle segment.

Certain two-stage turbines have a cantilevered second stage nozzle mounted and cantilevered from the outer band. There is little or no access between first and second stage rotor disks to secure the segment at the inner band. Typical second stage nozzles are configured with multiple airfoil or vane segments. Two vane designs, referred to as a doublets, are a very common design. Doublets offer performance advantages in reducing split-line leakage flow between vane segments. However, the longer chord length of the outer band and mounting structure compromises the durability of the doublet. The longer chord length causes an increase of chording stresses due to the temperature gradient through the band and increased non-uniformity of airfoil stresses. The box structure of a vane doublet also contributes to uneven stresses in the segment. The trailing vane of a doublet typically sees significantly higher stresses which limits the life of the segment.

It is highly desirable to have a turbine nozzle segment that provides access for a cooling air supply between first and second stage rotor disks and the ability to be cantilever mounted from the outer band. It is also desirable to have turbine nozzle segments that avoid reduction in the durability of multiple vane segments due to longer chord length of the outer band and mounting structure. It is also desirable to have turbine nozzle segments that avoid increase of chording stresses due to temperature gradient through the band and increased non-uniformity of airfoil stresses due to longer chord length of the multiple vane segments. It is also desirable to have turbine nozzle segments that avoid increase of stresses in a trailing vane of a doublet or other multiple vane segment which limits the life of the segment.

A single vane segment, referred to as a singlet, is disclosed in U.S. patent application Ser. No. 10/375,585 and has a bifurcating stiffening rib which divides a bifurcated cavity into forward and aft cavities requiring two baffles. A cantilevered mount for turbine nozzle segments is disclosed in U.S. patent application Ser. No. 10/375,441. Due to the cantilevered design of the second stage nozzle, there is insufficient access between the first and second stage rotor disks to feed cooling air from a radially inner side of the nozzle. Thus, both baffles must be fed cooling air from the outer side of the nozzle. Thus, it is desirable to have, a baffle for a bifurcated cavity that is able to be fed cooling air from the outer side of the nozzle to both the forward and aft cavities. It is desirable to have a baffle able to feed cooling air from the baffle to an interstage seal cavity.

SUMMARY OF THE INVENTION

A bifurcated impingement baffle for use in a gas turbine engine turbine nozzle includes axially forward and aft chambers with a gap therebetween, impingement holes through forward and aft baffle walls of the forward and aft chambers respectively, and a plenum chamber in fluid flow communication with the forward and aft chambers. An exemplary embodiment of the bifurcated impingement baffle further includes a single cooling air inlet to the plenum chamber. A plenum chamber enclosure encloses the plenum chamber. A sealing plate is mounted between and sealed to the plenum chamber enclosure and the forward and aft chambers. The sealing plate has forward and aft inlet apertures disposed between the plenum chamber and the forward and aft chambers respectively. Forward and aft end plates cap radially inner ends of the forward and aft chambers. An outlet aperture in the forward end plate has an interstage seal cavity feed tube disposed therethrough. A tube end cap seals the interstage seal cavity feed tube. The interstage seal cavity feed tube feeds cooling air from the baffle to an interstage seal cavity.

The bifurcated impingement baffle is designed for use in a gas turbine engine turbine nozzle and more particularly in a turbine nozzle segment having at least one hollow airfoil extending radially between radially outer and inner band segments. The airfoil has an airfoil wall with pressure and suction sides extending axially between leading and trailing edges of the airfoil and surrounding a bifurcated cavity. A bifurcating rib extending through the bifurcated cavity divides the bifurcated cavity into forward and aft cavities. The forward and aft chambers are disposed in the forward and aft cavities respectively.

The bifurcated impingement baffle allows cooling air to be fed from the outer side of the nozzle. It also allows a single inlet and spoolie to be used to feed the impingement baffle. The bifurcated impingement baffle also provides for feeding cooling air from the baffle to an interstage seal cavity. The bifurcated impingement baffle allows the use of a singlet nozzle which is very durable. The baffle's plenum fits within the space constraints of the nozzle and operates with only one spoolie which reduces leakage and complexity.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
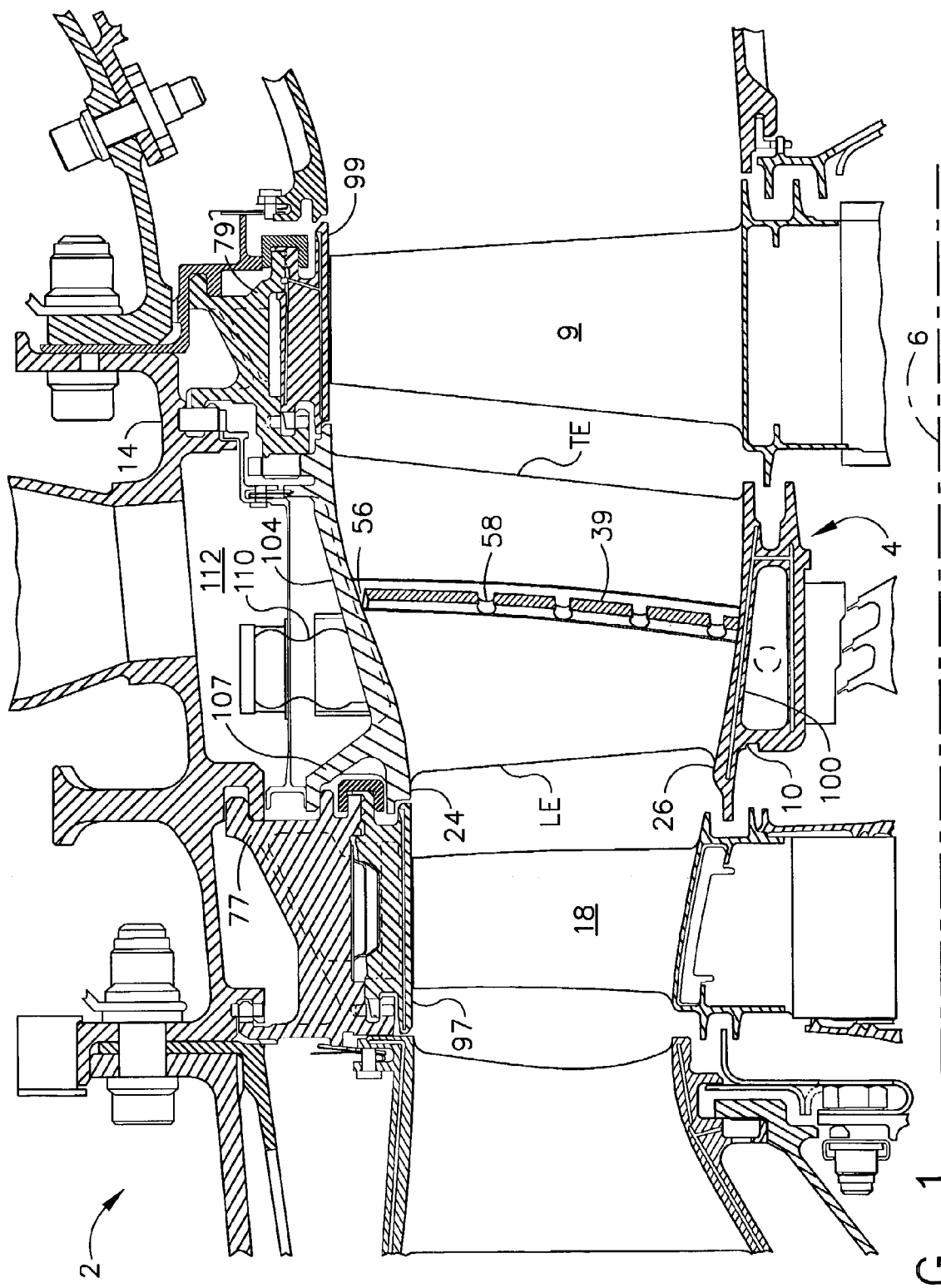
FIG. 1 is a cross-sectional view illustration of a section of a gas turbine engine high pressure turbine second stage turbine nozzle with a vane airfoil having a hollow interior bifurcated by a bifurcating rib extending between pressure and suction sides of the airfoil.

Illustrated in FIG. 1 is an exemplary second stage turbine nozzle 4 of an aircraft gas turbine engine high pressure turbine 2. The nozzle 4 is circumscribed about a longitudinal or axial centerline axis 6 and includes an annular casing 14 from which a plurality of nozzle segments 10 are cantilevered mounted. The nozzle segment 10 is disposed between an immediately upstream row of high pressure turbine first stage rotor blades 18 and an immediately downstream row of turbine second stage rotor blades 9. First and second shrouds 97 and 99 encircle the first and second stage turbine rotor blades 18 and 9 and are supported by first and second shroud supports 77 and 79, respectively, which depend radially inwardly from and are connected to the annular casing 14. The nozzle segments 10 are hooked by forward hooks 107 to the first shroud supports 77 and are cantilevered from the second shroud supports 79.

Figure 2:
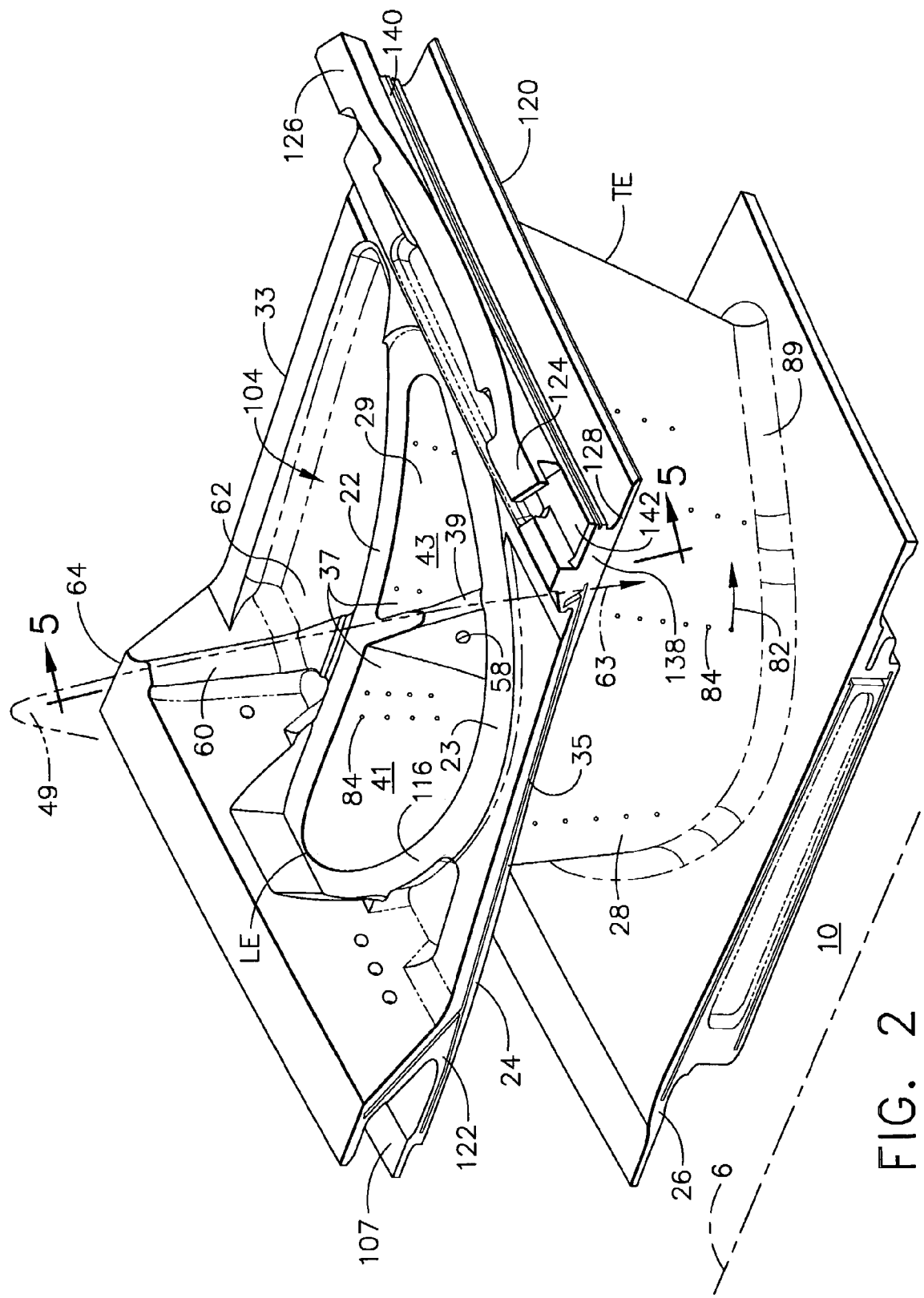
FIG. 2 is a perspective view illustration of the second stage turbine nozzle segment illustrated in FIG. 1.

FIG. 2 illustrates one of the nozzle segments 10 including a single hollow vane airfoil 28 that extends radially between and is integrally joined to radially outer and inner band segments 24 and 26 which are arcuate in shape. The airfoil 28 has pressure and suction sides 22 and 23 and extends axially between leading and trailing edges LE and TE. Each nozzle segment 10 has only one airfoil 28 which is located between circumferentially spaced apart pressure and suction side edges 33 and 35 of the radially outer and inner band segments 24 and 26. The nozzle segment 10 is illustrated as an integral and made from a unitary one-piece casting. The hollow airfoil 28 has an airfoil wall 29 surrounding a bifurcated cavity 37 formed by a bifurcating rib 39 extending between the pressure and suction sides 22 and 23 and splitting the cavity into axially forward and aft cavities 41 and 43.

A stiffening rib 60 extends radially outwardly from a radially outer surface 62 of the outer band segment 24 and extends axially and circumferentially from a pressure side forward corner 64 of the outer band segment 24 to the bifurcating rib 39. The stiffening rib 60 and the bifurcating rib 39 run in a direction 63 of the resultant gas loads on the airfoil 28 and provides significant stiffness to the nozzle segment 10. The stiffening rib 60 is axially and circumferentially aligned with the bifurcating rib 39. The stiffening rib 60 and the bifurcating rib 39 may be viewed as being substantially co-planar. This provides stiffness to the nozzle segment 10 and reduces the deflections thereof. The stiffening rib 60 also provides additional safety in the event of airfoil cracking.

Figure 4:
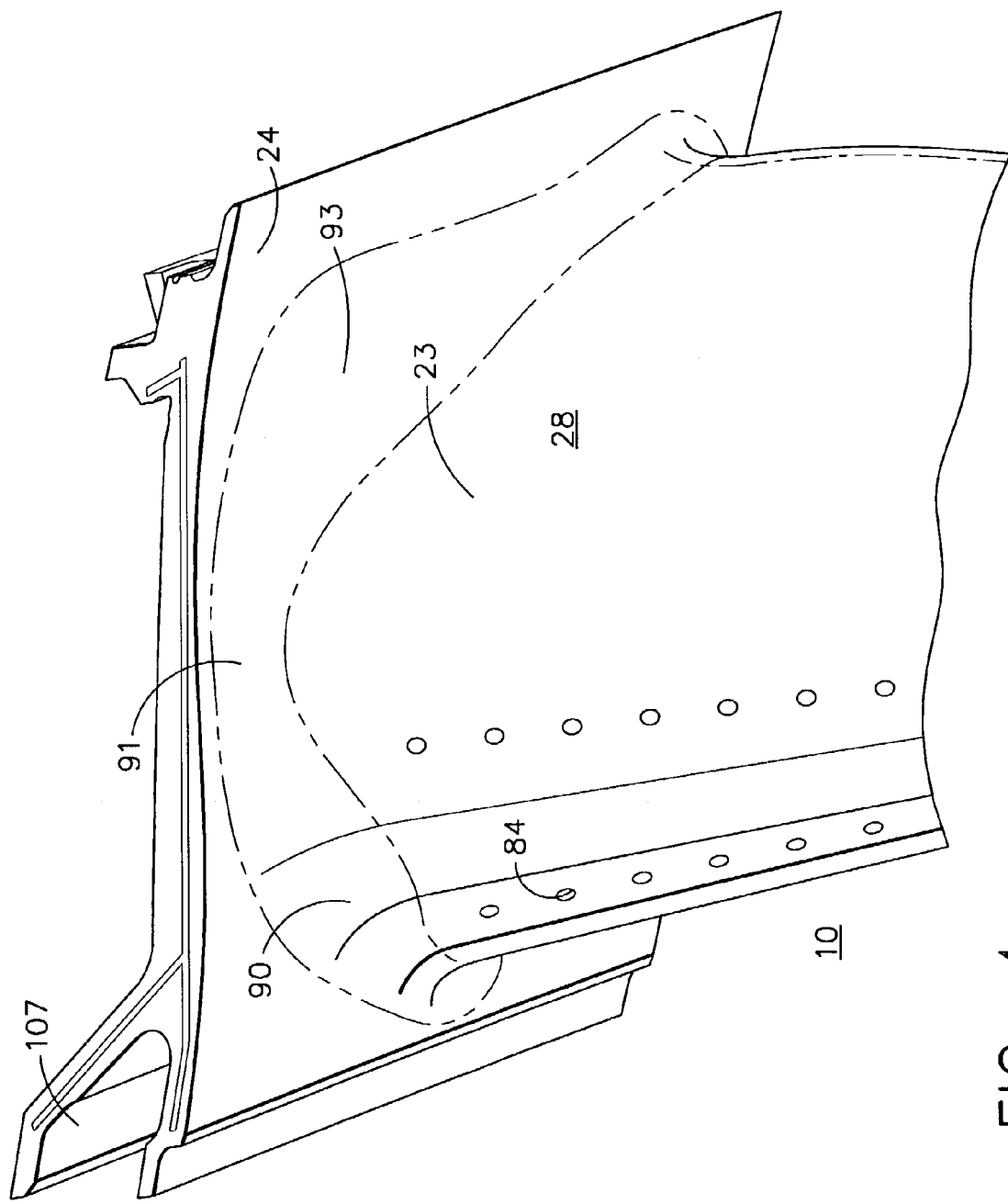
FIG. 4 is a radially outwardly looking perspective view illustration of the airfoil illustrated in FIG. 2.
Figure 5:
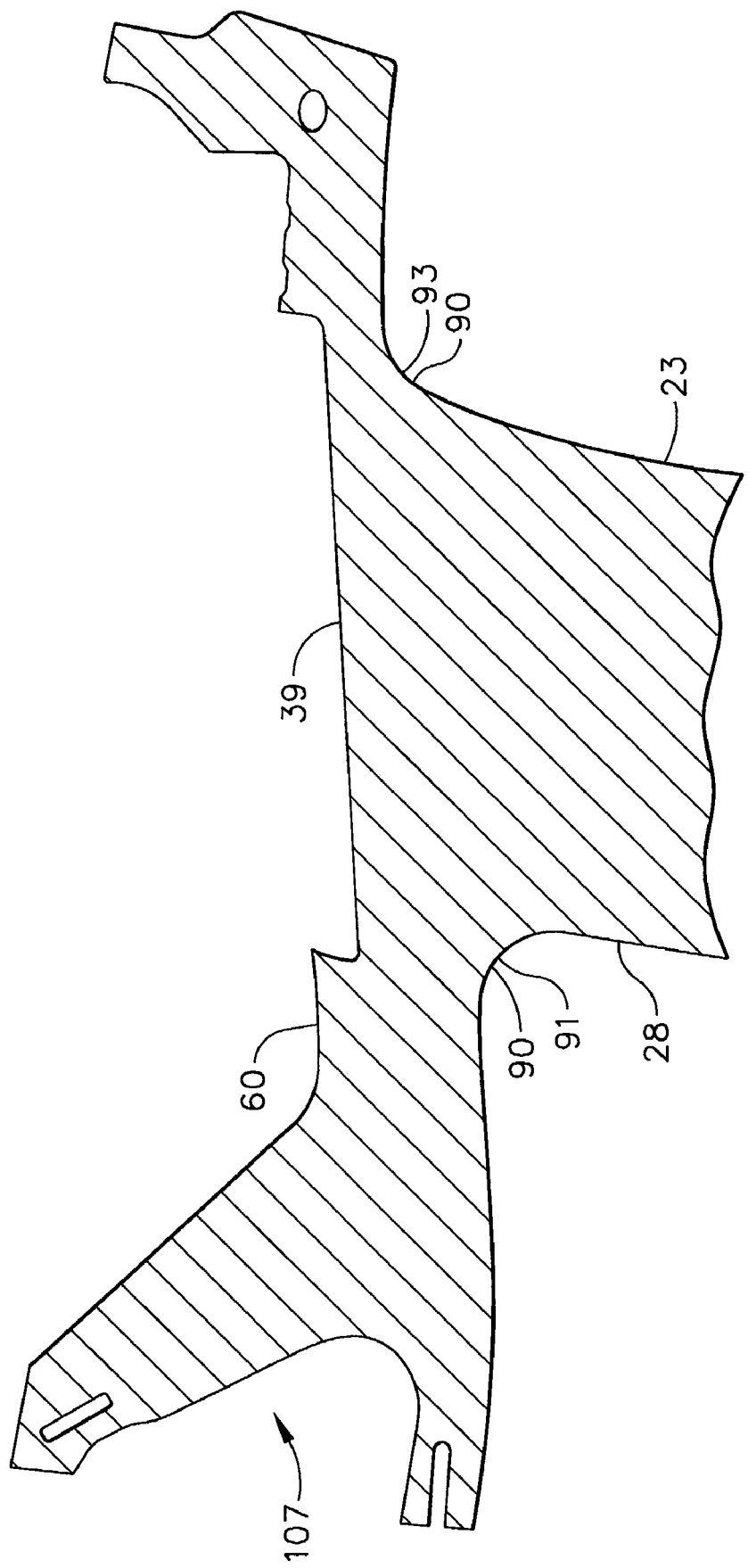
FIG. 5 is a cross-sectional view illustration of the bifurcating rib and a stiffening rib through 5—5 in FIG. 2.

The forward hook 107 extends forwardly from the outer band segment 24. A radially inner airfoil fillet 89 runs around a junction between the airfoil 28 and the inner band segment 26. Illustrated in FIGS. 4 and 5, is a radially outer airfoil fillet 91 running around a junction between the airfoil 28 and the outer band segment 24. The outer airfoil fillet 91 has a first enlarged portion 90 under the forward hook 107 to minimize mechanical stresses in this region. The outer airfoil fillet 91 has a second enlarged portion 93 where the bifurcating rib 39 intersects the suction side 23 of the airfoil 28 to minimize mechanical stresses in this region.

The bifurcating rib 39 running down the airfoil 28 provides a number of benefits including helping to prevent fatigue cracking around the airfoil fillet from propagating across the rib so the airfoil will not fail. It allows the airfoil wall 29 to be thinner than with a conventional single cavity design because of increased support from the bifurcating rib 39 which makes the airfoil wall 29 along the pressure side 22 of the airfoil 28 less prone to ballooning. The bifurcating rib 39 is angled with respect to the pressure and suction sides 22 and 23 of the airfoil 28 to allow an impingement-cooling bifurcated insert or baffle to be assembled into the forward and aft cavities 41 and 43 illustrated in FIGS. 2 and 3.

The bifurcated cavity 37 makes it necessary to have two impingement-cooling baffles. Due to the cantilevered design of the nozzle segment 10, there is no access between the first and second stage rotor blades 18 and 9 to feed cooling air from a radially inner side 100 of the nozzle segment 10. Thus, both baffles must be fed from a radially outer side 104 side of the nozzle segment. This presents challenges because there is limited space on the outer side of the nozzle. Two baffles could be used if fed from independent spoolies, but this configuration is complex to assemble, and has more leakage than if a single spoolie were used to feed both baffles.

Figure 3:
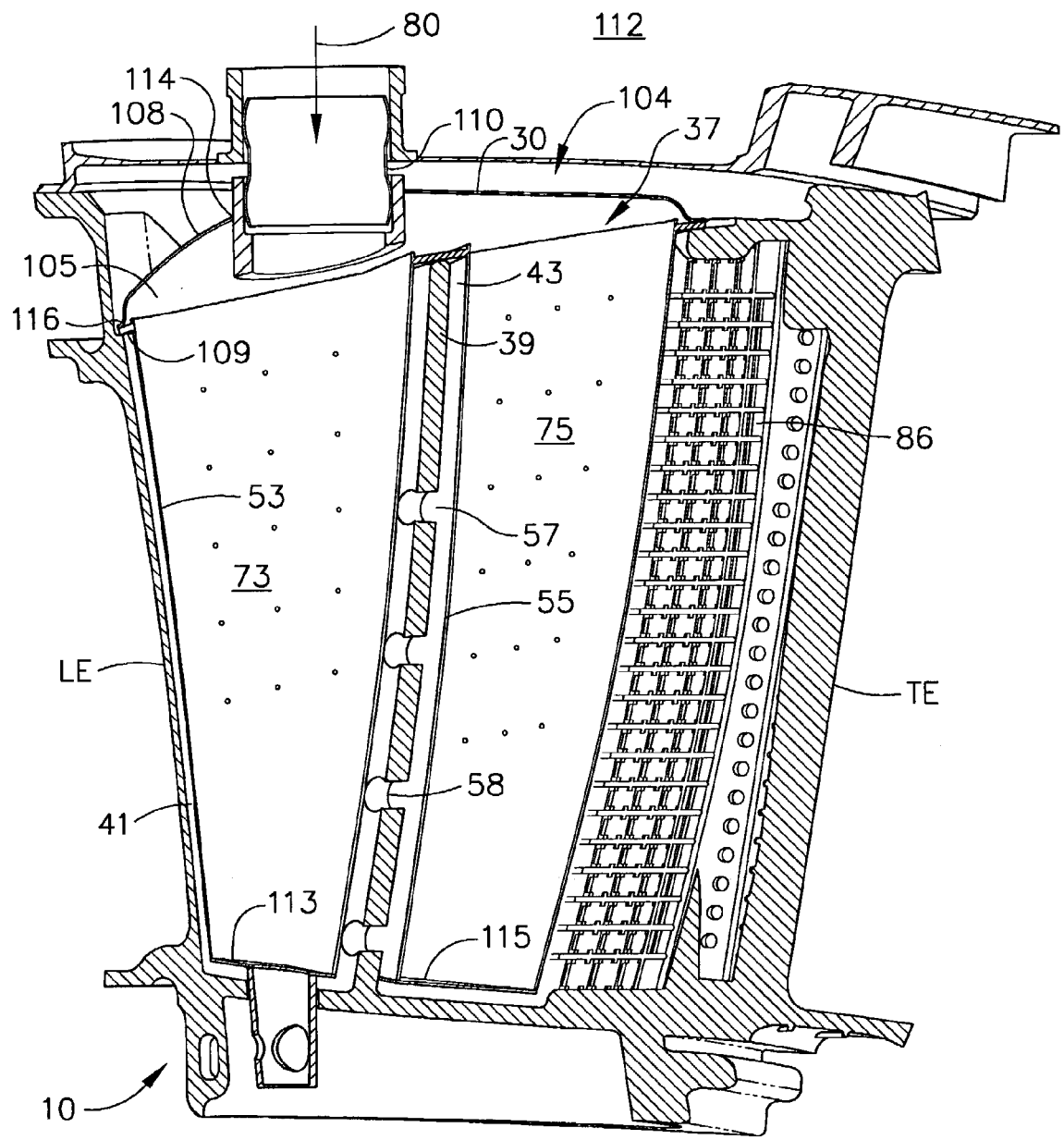
FIG. 3 is a cross-sectional view illustration of the second stage turbine nozzle segment illustrated in FIG. 1.
Figure 6:
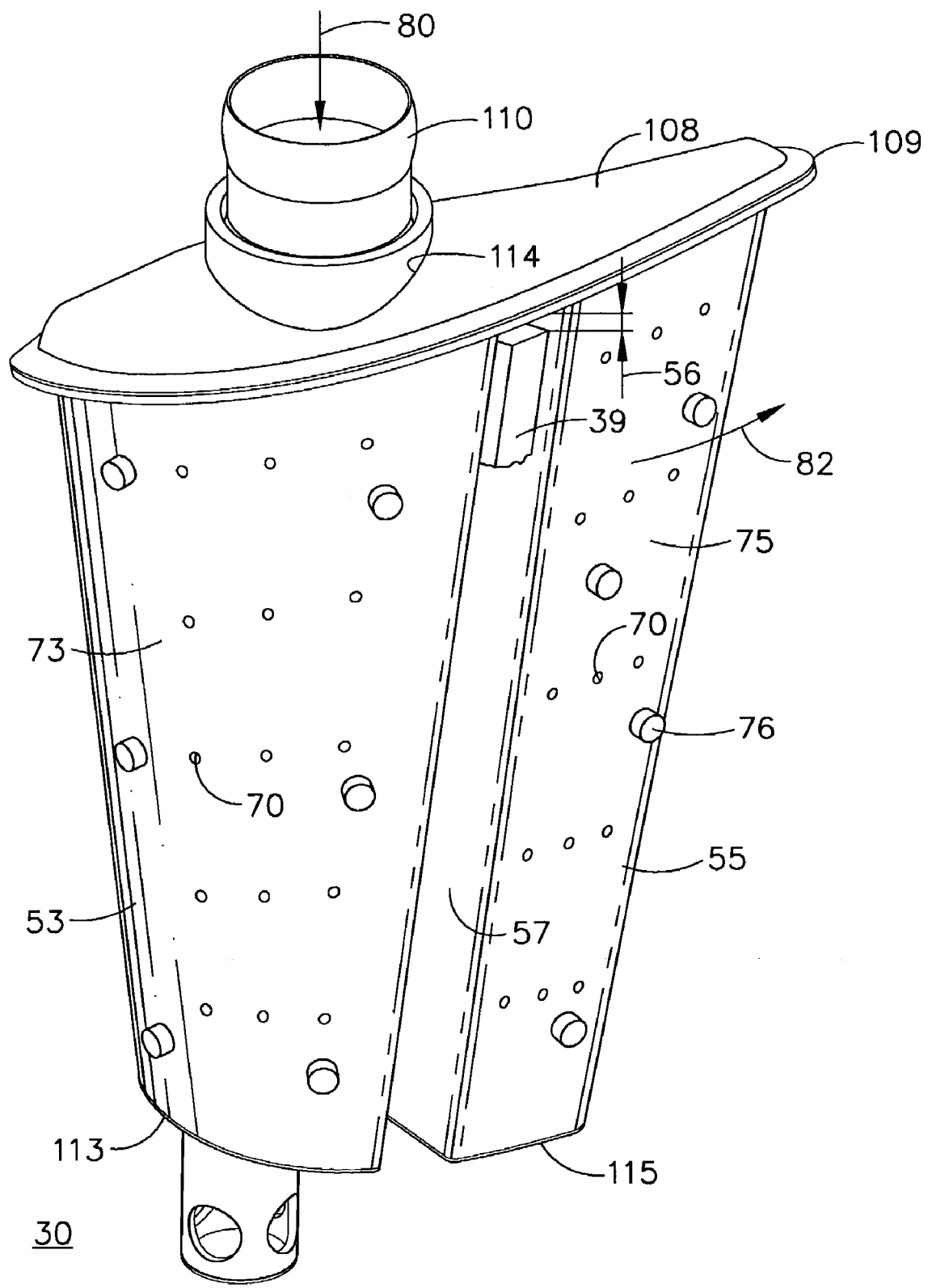
FIG. 6 is a perspective view illustration of a two chamber impingement baffle disposed in the bifurcated interior of the hollow vane illustrated in FIGS. 2 and 3.
Figure 7:
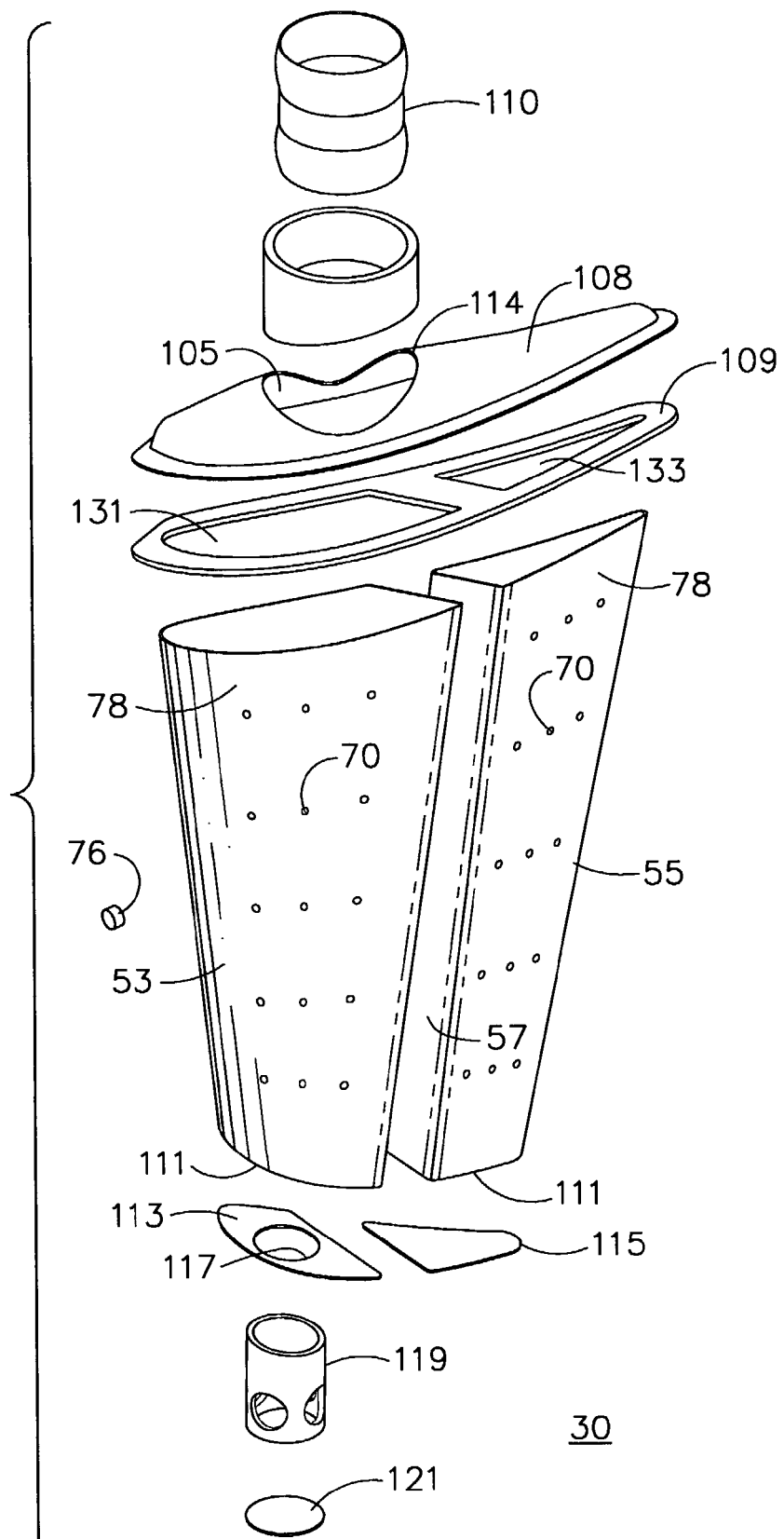
FIG. 7 is an exploded perspective view illustration of the impingement baffle illustrated in FIG. 6.

Illustrated in FIGS. 3, 6, and 7 is a bifurcated impingement baffle 30 disposed in the bifurcated cavity 37. The bifurcated impingement baffle 30 has axially forward and aft chambers 53 and 55 with an axially extending axial gap 57 therebetween and the forward and aft chambers 53 and 55 are disposed in the forward and aft cavities 41 and 43, respectively. The bifurcated impingement baffle 30 has a plenum chamber 105 enclosed within a plenum chamber enclosure 108, illustrated as a dome, which is designed to receive cooling air 80 through a single cooling air inlet 114 to the plenum chamber from an annular plenum 112 between the nozzle segments 10 and the annular casing 14 which are illustrated in FIG. 1. A single spoolie 110 is disposed in the cooling air inlet 114.

Again referring to FIGS. 3, 6, and 7, the plenum chamber enclosure 108 is mounted on a sealing plate 109 and to which is mounted the forward and aft chambers 53 and 55. Cooling air passes and may be metered through forward and aft inlet apertures 131 and 133 in the sealing plate 109, respectively. The cooling air is flowed through the forward and aft inlet apertures 131 and 133 into the forward and aft chambers 53 and 55, respectively. Forward and aft end plates 113 and 115 cap radially inner ends 111 of the forward and aft chambers 53 and 55. The forward end plate 113 has an outlet aperture 117 through which is disposed an interstage seal cavity feed tube 119, which in turn, is sealed by a tube end cap 121. Alternatively, the interstage cavity feed tube could be disposed through an outlet aperture in the aft end plate.

The forward and aft chambers 53 and 55 are received in the forward and aft cavities 41 and 43, respectively, and the bifurcating rib 39 is disposed within the gap 57 between the forward and aft chambers. The forward and aft chambers 53 and 55 can be slid into the forward and aft cavities 41 and 43 of the bifurcated impingement baffle 30 during assembly of the second stage turbine nozzle 4. The bifurcated impingement baffle 30 is then brazed or welded to the nozzle segment 10 around a collar 116 of the nozzle segment illustrated in FIGS. 2 and 3. The bifurcated impingement baffle 30 and the gap 57 between the forward and aft cavities 41 and 43 allows the impingement baffle to straddle the bifurcating rib 39.

Further referring to FIGS. 3, 6, and 7, impingement holes 70 through forward and aft baffle walls 73 and 75 of the forward and aft chambers 53 and 55, respectively, are designed for impingement-cooling of the airfoil wall 29. Stand-off pads 76 on outer surfaces 78 of the forward and aft baffle walls 73 and 75 position the bifurcated impingement baffle 30 and the axially forward and aft chambers 53 and 55 within the bifurcated cavity 37 and the forward and aft cavities 41 and 43, respectively, to provide good impingement-cooling of the airfoil wall 29. Spent vane impingement air 82 is discharged from the airfoil wall 29 through film cooling holes 84 therethrough as illustrated in FIGS. 2 and 8.

The bifurcating rib 39 has at least one crossover hole 58 therethrough though a number of crossover holes 58 are in the exemplary embodiment of the nozzle segment 10 as illustrated in FIGS. 1 and 5. The crossover holes 58 allow a bulk of the cooling air 80 to be impinged onto the leading edge LE, and then provide additional cooling by passing through the bifurcating rib 39 and exiting the airfoil 28 through turbulated passages 86 in the trailing edge TE of the airfoil 28 as illustrated in FIG. 3. The crossover holes 58 in the bifurcating rib 39 allow much of the cooling air 80 to be used to cool both the leading and trailing edges LE and TE of the airfoil 28. A radially extending radial gap 56 between the bifurcated impingement baffle 30 and the bifurcating rib 39 also allows the cooling air 80 to pass from the forward cavity 41 to the aft cavity 43 to cool both the leading and trailing edges LE and TE of the airfoil 28. In some embodiments of the nozzle segment this could eliminate the use of the crossover holes 58. The crossover holes 58 also improve producibility because they allow a single casting core to be used. Quartz rods may be used to form the crossover holes 58 and provide rigidity to the core. A thermal barrier coating (TBC) may be applied all around the airfoil 28 with better coverage and greater ease than is usually possible with multiple airfoil vane segments. The single airfoil vane segment provides flexibility to replace just a single airfoil in an engine which is beneficial such as in the case of problems with the fuel nozzles which cause hot streaks on the airfoils. These hot streaks typically will damage only one airfoil.

The nozzle segment 10 is cantilevered from the annular casing 14 by the outer band segment 24. The airfoil 28 has a high twist angle which causes a resultant gas load vector in the direction 63 of the resultant gas loads to fall outside a wheelbase 120 at an aft end 128 of the nozzle segment 10 at the outer band segment 24 as shown in FIG. 2. The wheelbase 120 generally is an axially aftwardly facing load face or faces 150 at the aft end 128 of the nozzle segment 10 at the outer band segment 24. The stiffening rib 60 and the bifurcating rib 39 are illustrated as being substantially centered about a center plane 49 that falls outside the wheelbase 120. This causes the nozzle segment 10 to want to rotate about a radial line normal to the centerline axis 6 and makes mounting and sealing of the single airfoil nozzle segment difficult. Referring further to FIGS. 1 and 8, the nozzle segments 10 are radially located by the forward hooks 107 at forward ends 122 of the outer band segments 24 and by clockwise and counter-clockwise open second and third hooks 124 and 126 on clockwise and counter-clockwise ends 138 and 140, respectively, at aft ends 128 of the outer band segments 24.

Figure 8:
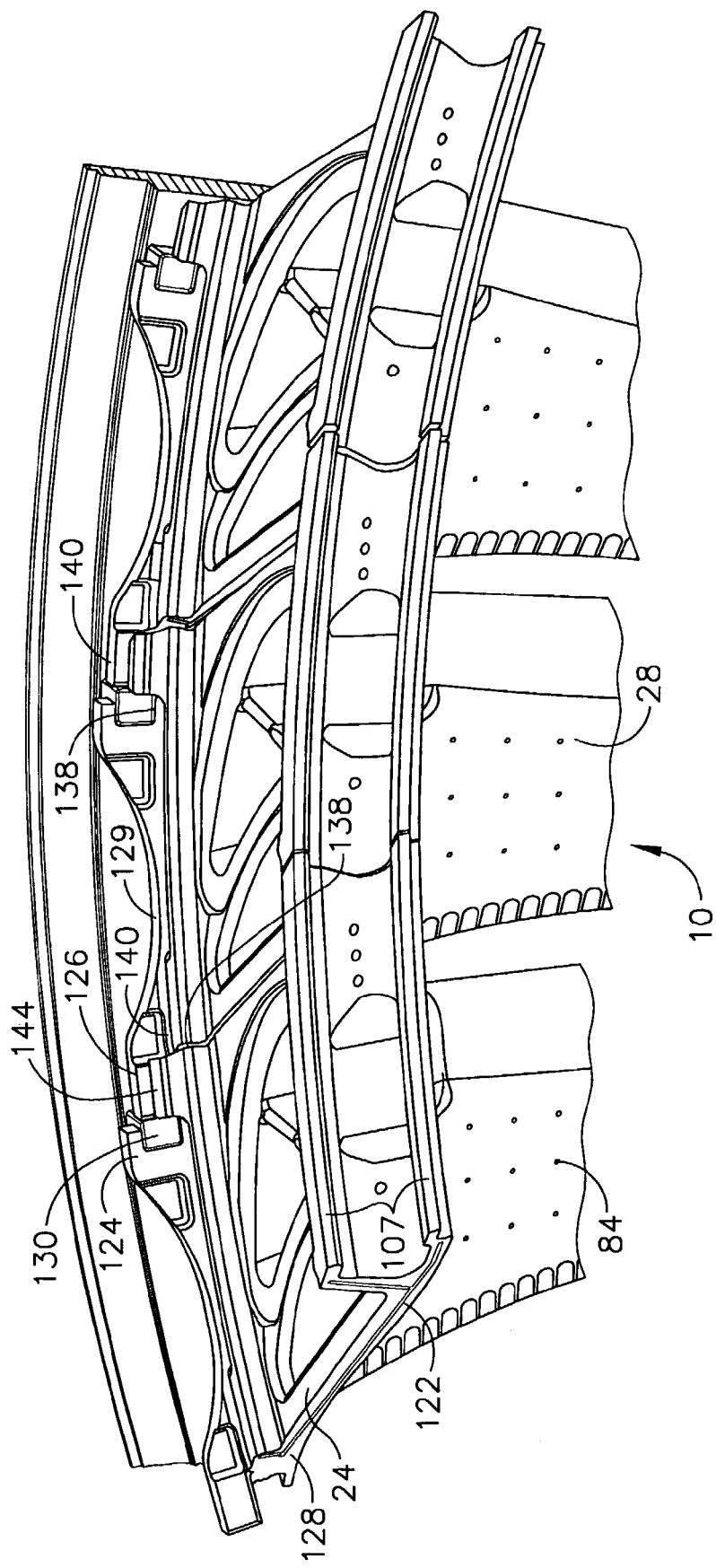
FIG. 8 is a perspective view illustration of a sector of the second stage turbine nozzle illustrated in FIG. 1.
Figure 9:
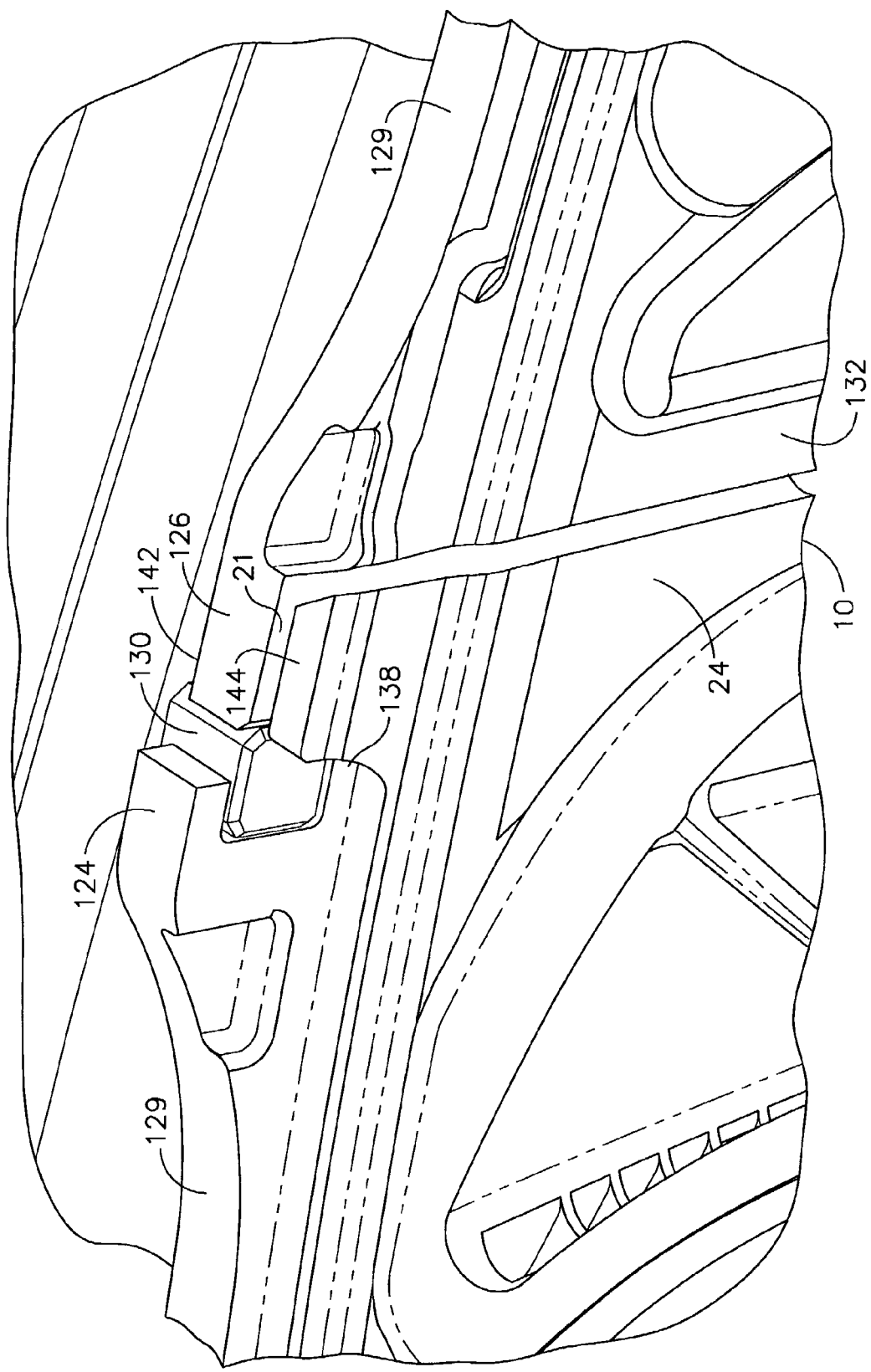
FIG. 9 is an enlarged perspective view illustration of aft support of the second stage turbine nozzle segments illustrated in FIG. 8.
Figure 10:
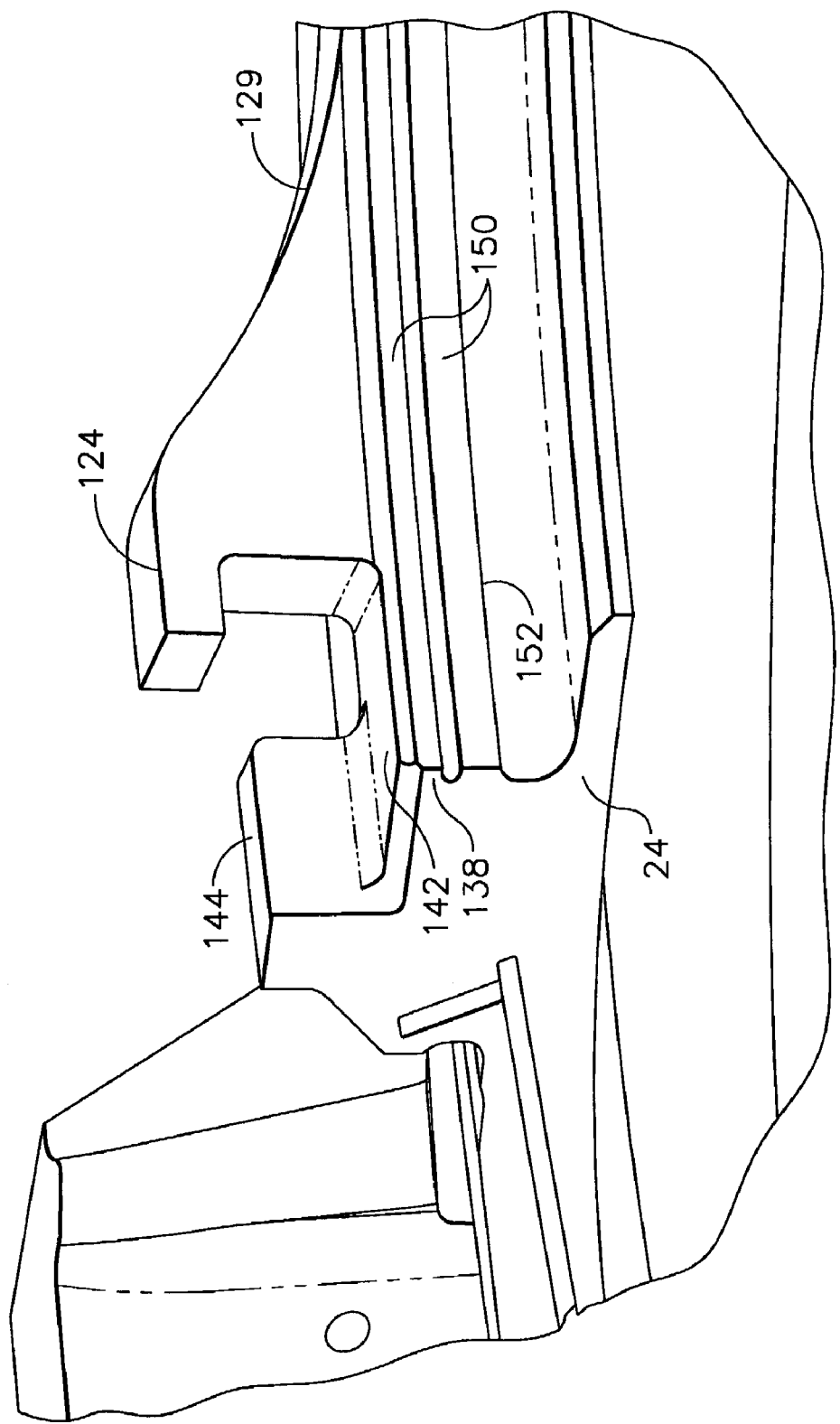
FIG. 10 is an enlarged perspective view illustration of anti-rotation and tangential load stops on one of the second stage turbine nozzle segments illustrated in FIG. 9.

Referring to FIGS. 8-10, the second and third hooks 124 and 126 of each nozzle segment 10 are illustrated as parts of an aft flange 129 at the aft end 128 of the outer band segments 24. The clockwise open second hook 124 engages a stud 130 extending axially forward from the second shroud support 79. The counter-clockwise open third hook 126 of an adjacent one 132 of the nozzle segments 10 engages a radially outwardly facing flat flange surface 142 at the clockwise end 138 of the aft flange 129 upon which the clockwise open second hook 124 is located. The clockwise and counter-clockwise open second and third hooks 124 and 126 and the stud 130 are all rectangularly-shaped. The clockwise open second hook 124 is C-shaped and the counter-clockwise open third hook 126 is a shiplap hook and is shiplapped with clockwise end 138 of the aft flange 129 and rests along the radially outwardly facing flat flange surface 142.

The clockwise and counter-clockwise open second and third hooks 124 and 126 are clockwise and counter-clockwise located on the nozzle segment with respect to a forward looking aft view but may also be from an aft looking forward view if the resultant gas load vector and the direction 63 are canted in counter-clockwise direction with respect to a forward looking aft view.

The nozzle segment 10 is prevented from rotating about a radial line normal to the centerline axis 6 at least in part by a load stop 144 extending radially outwardly from the outer band segment 24 and engaging an axially forwardly facing load face 21 on the counter-clockwise open third hook 126 of the adjacent one 132 of the nozzle segments 10. The load stop 144 counters a moment resulting from the sum of the gas loads being off the wheelbase of the axially aftwardly facing load faces 150 located on an aft side 152 of the aft flange 129. The entire turbine nozzle assembly will then be in equilibrium. The turbine nozzles 4 are assembled radially which allow for axial overlap of these features. The load stop 144 and the aftwardly facing load face 150 may be precisely produced in the same machining set-up. This allows the axial load face to be used as an air seal at the aft end of the nozzle with a high degree of control over leakage. The hooks, stud, and stops may also be used on nozzle segments 10 having more than one airfoil, particularly, if the resultant gas loads to fall outside the wheelbase of the nozzle segment 10 at the outer band segments.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A bifurcated impingement baffle comprising:
    axially forward and aft chambers with a gap therebetween,
    impingement holes through forward and aft baffle walls of the forward and aft chambers respectively,
    a plenum chamber in fluid flow communication with the forward and aft chambers, and
    a plenum chamber enclosure enclosing the plenum chamber and attached to the forward and aft chambers.

2. A bifurcated impingement baffle as claimed in claim 1, further comprising a single cooling air inlet to the plenum chamber.

3. A bifurcated impingement baffle as claimed in claim 2 further comprising:
    a sealing plate mounted between and sealed to the plenum chamber enclosure and the forward and aft chambers, and
    the sealing plate having forward and aft inlet apertures disposed between the plenum chamber and the forward and aft chambers respectively.

4. A bifurcated impingement baffle as claimed in claim 3, further comprising forward and aft end plates capping radially inner ends of the forward and aft chambers.

5. A bifurcated impingement baffle comprising:
    axially forward and aft chambers with a gap therebetween,
    impingement holes through forward and aft baffle walls of the forward and aft chambers respectively,
    a plenum chamber in fluid flow communication with the forward and aft chambers,
    a single cooling air inlet to the plenum chamber,
    a sealing plate mounted between and sealed to the plenum chamber enclosure and the forward and aft chambers,
    the sealing plate having forward and aft inlet apertures disposed between the plenum chamber and the forward and aft chambers respectively,
    forward and aft end plates capping radially inner ends of the forward and aft chambers, and
    an outlet aperture in the forward end plate and an interstage seal cavity feed tube disposed through the outlet aperture.

6. A bifurcated impingement baffle as claimed in claim 5, further comprising a tube end cap sealing the interstage seal cavity feed tube.

7. A turbine nozzle segment comprising:
    at least one hollow airfoil extending radially between radially outer and inner band segments,
    the airfoil located between circumferentially spaced apart pressure and suction side edges of the radially outer and inner band segments,
    the airfoil having an airfoil wall with pressure and suction sides extending axially between leading and trailing edges of the airfoil,
    the airfoil wall surrounding a bifurcated cavity,
    a bifurcating rib extending through the bifurcated cavity and between the pressure and suction sides of the airfoil wall dividing the bifurcated cavity into forward and aft cavities,
    a bifurcated impingement baffle including axially forward and aft chambers with a gap therebetween,
    impingement holes through forward and aft baffle walls of the forward and aft chambers respectively,
    a plenum chamber in fluid flow communication with the forward and aft chambers, and
    a plenum chamber enclosure enclosing the plenum chamber and attached to the forward and aft chambers, and
    the forward and aft chambers disposed in the forward and aft cavities respectively.

8. A turbine nozzle segment as claimed in claim 7, further comprising a single cooling air inlet to the plenum chamber.

9. A turbine nozzle segment as claimed in claim 8, further comprising:
    a sealing plate mounted between and sealed to the plenum chamber enclosure and the forward and aft chambers, and
    the sealing plate having forward and aft inlet apertures disposed between the plenum chamber and the forward and aft chambers respectively.

10. A turbine nozzle segment as claimed in claim 8 further comprising at least one crossover hole.

11. A turbine nozzle segment comprising:
    at least one hollow airfoil extending radially between radially outer and inner band segments,
    the airfoil located between circumferentially spaced apart pressure and suction side edges of the radially outer and inner band segments,
    the airfoil having an airfoil wall with pressure and suction sides extending axially between leading and trailing edges of the airfoil,
    the airfoil wall surrounding a bifurcated cavity,
    a bifurcating rib extending through the bifurcated cavity and between the pressure and suction sides of the airfoil wall dividing the bifurcated cavity into forward and aft cavities,
    a bifurcated impingement baffle including axially forward and aft chambers with a gap therebetween,
    impingement holes through forward and aft baffle walls of the forward and aft chambers respectively,
    a plenum chamber in fluid flow communication with the forward and aft chambers,
    the forward and aft chambers disposed in the forward and aft cavities respectively,
    a single cooling air inlet to the plenum chamber,
    a plenum chamber enclosure enclosing the plenum chamber,
    a sealing plate mounted between and sealed to the plenum chamber enclosure and the forward and aft chambers,
    the sealing elate having forward and aft inlet apertures disposed between the plenum chamber and the forward and aft chambers respectively,
    forward and aft end plates capping radially inner ends of the forward and aft chambers, and
    an outlet aperture in the forward end plate and an interstage seal cavity feed tube disposed through the outlet aperture.

12. A turbine nozzle segment comprising:
    a single hollow airfoil extending radially between radially outer and inner band segments,
    the airfoil located between circumferentially spaced apart pressure and suction side edges of the radially outer and inner band segments, the airfoil having an airfoil wall with pressure and suction sides extending axially between leading and trailing edges of the airfoil, the airfoil wall surrounding a bifurcated cavity, a bifurcating rib extending through the bifurcated cavity and between the pressure and suction sides of the airfoil wall dividing the bifurcated cavity into forward and aft cavities, a bifurcated impingement baffle including axially forward and aft chambers with a gap therebetween, impingement holes through forward and aft baffle walls of the forward and aft chambers respectively, a plenum chamber in fluid flow communication with the forward and aft chambers, and a plenum chamber enclosure enclosing the plenum chamber and attached to the forward and aft chambers, and the forward and aft chambers disposed in the forward and aft cavities respectively.

13. A turbine nozzle segment as claimed in claim 12, further comprising a single cooling air inlet to the plenum chamber.

14. A turbine nozzle segment as claimed in claim 13 further comprising at least one crossover hole.

15. A turbine nozzle segment as claimed in claim 14, further comprising:

a sealing plate mounted between and sealed to the plenum chamber enclosure and the forward and aft chambers, and the sealing plate having forward and aft inlet apertures disposed between the plenum chamber and the forward and aft chambers respectively.

16. A turbine nozzle segment as claimed in claim 12 further comprising a stiffening rib extending radially outwardly from and along a radially outer surface of the outer band segment and extending axially and circumferentially from a pressure side forward corner of the outer band segment to the bifurcating rib.

17. A turbine nozzle segment as claimed in claim 16 wherein the stiffening rib is axially and circumferentially aligned with the bifurcating rib.

18. A turbine nozzle segment comprising:

a single hollow airfoil extending radially between radially outer and inner band segments, the airfoil located between circumferentially spaced apart pressure and suction side edges of the radially outer and inner band segments, the airfoil having an airfoil wall with pressure and suction sides extending axially between leading and trailing edges of the airfoil, the airfoil wall surrounding a bifurcated cavity, a bifurcating rib extending through the bifurcated cavity and between the pressure and suction sides of the airfoil wall dividing the bifurcated cavity into forward and aft cavities, a bifurcated impingement baffle including axially forward and aft chambers with a gap therebetween, impingement holes through forward and aft baffle walls of the forward and aft chambers respectively, a plenum chamber in fluid flow communication with the forward and aft chambers, the forward and aft chambers disposed in the forward and aft cavities respectively, a single cooling air inlet to the plenum chamber, at least one crossover hole, forward and aft end plates capping radially inner ends of the forward and aft chambers, and an outlet aperture in the forward end plate and an interstage seal cavity feed tube disposed through the outlet aperture.

19. A bifurcated impingement baffle comprising:

axially forward and aft chambers with a gap therebetween, impingement holes through forward and aft baffle walls of the forward and aft chambers respectively, a plenum chamber in fluid flow communication with the forward and aft chambers, a single cooling air inlet to the plenum chamber, a sealing plate mounted between and sealed to the plenum chamber enclosure and the forward and aft chambers, the sealing plate having forward and aft inlet apertures disposed between the plenum chamber and the forward and aft chambers respectively, forward and aft end plates capping radially inner ends of the forward and aft chambers, and a plurality of crossover holes through the bifurcating rib.

20. A bifurcated impingement baffle as claimed in claim 19 wherein the bifurcating rib is aligned with a direction of resultant gas loads on the airfoil.

21. A bifurcated impingement baffle as claimed in claim 20 further comprising an airfoil fillet running around a junction between the airfoil and the outer band segment and an enlarged portion of the airfoil fillet where the bifurcating rib intersects the suction side of the airfoil.

* * * * *